(12) United States Patent  (10) Patent No.: US 7,809,334 B2
Chen et al.                (45) Date of Patent:     Oct. 5, 2010

(54) SIGNAL TRANSMITTING AND RECEIVING APPARATUS CAPABLE OF PREVENTING THE RECEIVING END FROM SATURATING

(75) Inventors: ShouFang Chen, Hsin-Chu Hsien (TW); Steve Wiyi Yang, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 980 days.

(21) Appl. No.: 11/549,976

(22) Filed: Oct. 17, 2006

(65) Prior Publication Data

US 2007/0275673 A1    Nov. 29, 2007

(30) Foreign Application Priority Data

May 23, 2006   (TW) ............................... 95118247 A

(51) Int. Cl.
*H04B 1/00*     (2006.01)
*H04B 15/00*    (2006.01)
(52) U.S. Cl. ..................................... 455/63.1; 455/296
(58) Field of Classification Search ................. 455/24, 455/63.1, 67.11, 67.13, 67.14, 82–83, 115.1–115.3, 455/226.1–226.3, 278.1, 296
See application file for complete search history.

(56) References Cited

U.S. PATENT DOCUMENTS

| | | | |
|---|---|---|---|
| 5,444,864 A * | 8/1995 | Smith | 455/84 |
| 5,974,301 A * | 10/1999 | Palmer et al. | 455/63.1 |
| 6,311,045 B1 | 10/2001 | Domokos | |
| 6,539,204 B1 * | 3/2003 | Marsh et al. | 455/63.1 |
| 6,567,649 B2 * | 5/2003 | Souissi | 455/83 |
| 2003/0080862 A1 | 5/2003 | Kranz | |
| 2006/0252398 A1 * | 11/2006 | Park et al. | 455/296 |

FOREIGN PATENT DOCUMENTS

EP      0905914 A2    3/1999

* cited by examiner

*Primary Examiner*—Tuan A Tran
(74) *Attorney, Agent, or Firm*—Winston Hsu; Scott Margo; Min-Lee Teng

(57) ABSTRACT

The present invention provides a signal emitting and receiving circuit and the operating method thereof. The circuit includes a signal receiving unit, a first signal generator and a second signal generator. The signal receiving unit receives a first signal and a second signal. The first signal generator generates the first signal. The second signal generator, which is couple to the signal receiving unit, generates the second signal. There is a phase difference between the first signal and the second signal such that in the signal receiving unit the two signals eliminate each other's power.

19 Claims, 3 Drawing Sheets

SIGNAL TRANSMITTING AND RECEIVING APPARATUS CAPABLE OF PREVENTING THE RECEIVING END FROM SATURATING

BACKGROUND OF INVENTION

1. Field of the Invention

The present invention relates to a signal transmitting and receiving apparatus and the method thereof, especially to a signal transmitting and receiving apparatus capable of preventing the receiving end from saturating and the corresponding method.

2. Description of the Prior Art

FIG. 1 illustrates an application circuit for Radio Frequency Identification (RFID) technology. In FIG. 1, a reader 100 includes a receiving circuit 130, a demodulator 140, a processing circuit 150, a modulator 160, an oscillator 170 and a power amplifier 180. The receiving circuit 130 receives RF signal through the antenna 110 and the power amplifier 180 emits RF signal through the antenna 120. When the reader 100 is about to emit an RF signal to the RFID tag 200, the modulator 160 modulates an oscillating signal generated by the oscillator 170 according to the control signal of the processing circuit 150 to form a modulated signal and the modulated signal is then amplified by the power amplifier 180 before being emitted through the antenna 120. The RFID tag 200 receives the RF signal RF1 from the antenna 120 and reflects an RF signal RF2 to the reader 100 after processing the signal RF1. The reflection RF signal RF2 is transmitted to the antenna 110 and then received by the receiving circuit 130. After being demodulated by the demodulator 140, the signal RF2 is further processed by the processing circuit 150. Ideally, the RF signal emitted through the antenna 120 will be transmitted to only the RFID tag 200; however in practice, a portion of the leakage RF signal, RF3, will be received by the antenna 110. Generally, signals amplified by the power amplifier 180 possess larger power (e.g., 30 dBm). Therefore, if the antenna isolation is not good enough (e.g., 25 dB to 30 dB), the receiving circuit 130 will probably saturate upon receiving the high-power leakage signal RF3. As a result, the reader 100 fails since the receiving circuit 130 is not able to receive the reflection signal RF2 having a power of e.g., −80 dBm.

SUMMARY OF INVENTION

It is therefore a primary objective of the claimed invention to provide a signal transmitting and receiving apparatus capable of preventing the receiving end from saturating.

According to an embodiment of the claimed invention, a signal transmitting and receiving apparatus is disclosed. The apparatus includes a signal receiving unit, a a first signal generator, and a second signal generator. The signal receiving unit receives a first signal and a second signal. The first signal generator generates the first signal. The second signal generator, which is coupled to the signal receiving unit, generates the second signal. There is a phase difference between the second signal and the first signal such that in the signal receiving unit the first signal and the second signal eliminate each other's power.

According to another embodiment of the claimed invention, a method for receiving and transmitting a signal is disclosed. The method includes: generating a first signal; generating a second signal; and transmitting the first signal and the second signal to a signal receiving unit. There is a phase difference between the second signal and the first signal such that in the signal receiving unit the first signal and the second signal eliminate each other's power.

According to still another embodiment of the claimed invention, an RFID reader is disclosed. The RFID reader is characterized by including a receiving unit, an oscillator, a first modulator, a power amplifier, and a second modulator. The receiving unit receives a first signal and a second signal. The oscillator generates an oscillating signal. The first modulator, which is coupled to the oscillator, modulates the oscillating signal to generate the first signal. The power amplifier, which is coupled to the first modulator, amplifies the first signal. The second modulator, which is coupled to the oscillator and the receiving unit, modulates the oscillating signal to generate the second signal. There is a phase difference between the second signal and the first signal such that in the signal receiving unit the first signal and the second signal eliminate each other's power.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
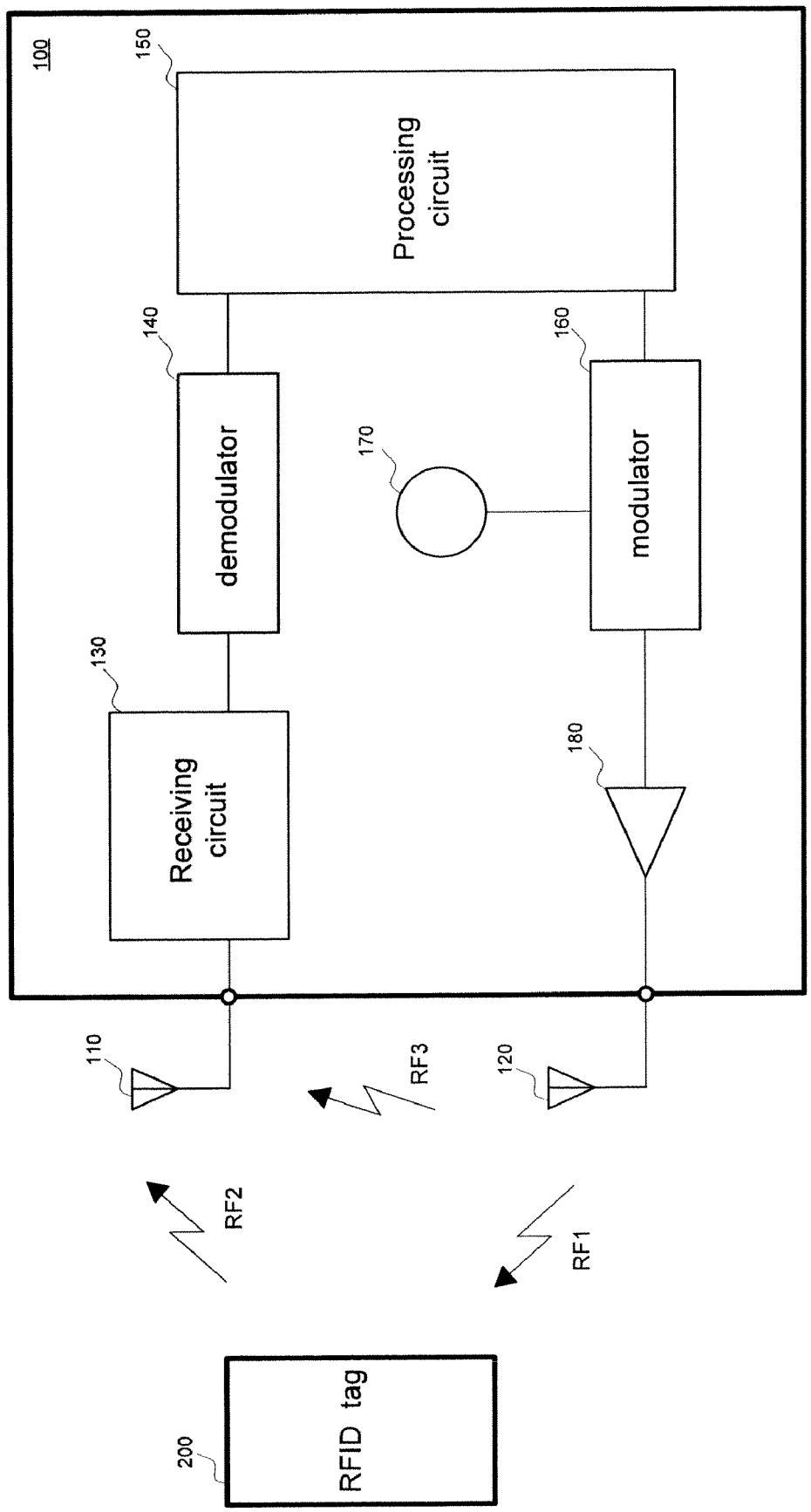
FIG. 1 is an application circuit for RFID technology.
Figure 2:
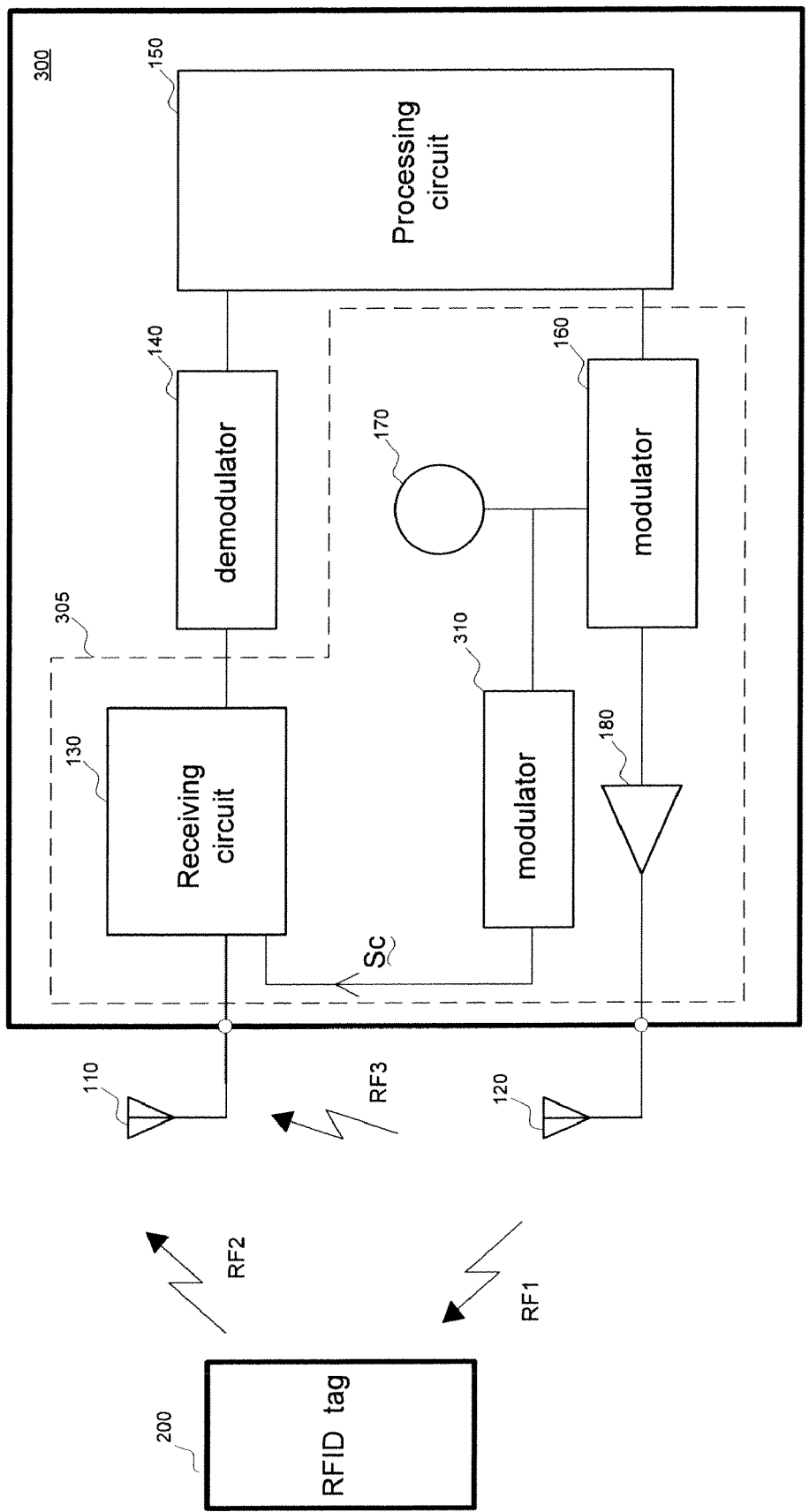
FIG. 2 is a signal transmitting and receiving apparatus capable of preventing the receiving end from saturating according to a first embodiment of the present invention.

FIG. 2 shows the signal transmitting and receiving apparatus according to a first embodiment of this invention. The reader 300 includes a receiving circuit 130, a demodulator 140, a processing circuit 150, a modulator 160, an oscillator 170, a power amplifier 180, and a modulator 310. The receiving circuit 130 receives signal through the antenna 110, and the power amplifier 180 emits signal through the antenna 120. The receiving circuit 130, the modulator 160, the oscillator 170, the power amplifier 180 and the modulator 310 form the signal transmitting and receiving circuit 305 of this present invention. The elements of the reader 300 possess the same function as those designated by the same number of the reader 100. The difference between the reader 300 and the reader 100 is that the reader 300 has a modulator 310, which is coupled to the receiving circuit 130 for modulating an oscillating signal generated by the oscillator 170. Then, the modulated signal Sc generated by the modulator 310 is transmitted to the receiving circuit 130 through a conductive wire in order to attenuate the RF signal RF3 transmitted through wireless transmission. For example, the oscillating signal generated by the oscillator 170 is assumed to be represented in the form of $\cos(w_c t+\phi)$. When the reader 300 is about to send a command to the RFID tag 200, the modulator 160 modulates the oscillating signal in the form of $A_1 \cos(w_m t)\cos(w_c t+\phi)$ to carry the command. It is noted that the RFID tag 200 does not yet reflect the reflecting signal RF2 to the antenna 110 at that time. When the reader 300 finishes transmitting the command to the RFID tag 200, the modulator 160 stops modulating, and then the reader 300 keeps emitting an RF signal to provide power to the RFID tag 200. At that time the receiving circuit 130 is ready to receive the reflection signal RF2. It is assumed that the signal which is utilized to power the RFID tag 200 and carries no command is represented in the form of $A_2 \cos(w_c t+\phi)$. On the other hand, to prevent the receiving circuit 130 from saturating, the modulator 310 modulates the oscillating signal such that the modulated signal Sc has the same frequency and a 180 degree phase difference with respect to the RF signal RF3. Furthermore, by adjusting the amplitude of the signal Sc to be close to the amplitude of the RF signal RF3, these two signals will eliminate each other's power when they are received by the receiving circuit 130 because of the phase difference and amplitudes. As a result, the receiving circuit 130 will not saturate due to the reception of the high-power RF signal RF3. Hence, one of the modulating methods of the modulator 310 is to adjust amplitude and phase of the oscillating signal. The modulated signal Sc could be represented in the form of $B \cos(w_c t+\varphi)$, where $\varphi=\phi\pm\pi$.

$$Sc = B\cos(w_c t + \varphi)$$
$$= B\cos(w_c t + \phi \pm \pi)$$
$$= -B\cos(w_c t + \phi)$$

The receiving circuit 130 receives the RF signal RF3 and the signal Sc at the same time.

$$\text{signal\_in} = A_2\cos(w_c t + \phi) - B\cos(w_c t + \phi)$$
$$= (A_2 - B)\cos(w_c t + \phi)$$

According to the above equation, the leakage power from the antenna 120 to the antenna 110 can be eliminated by properly adjusting the amplitude B of the signal Sc to restrain the amplitude of the RF signal RF3. One of the main purposes of the modulator 310 is to adjust the phase of the oscillating signal, and it could be performed by several methods. In general, the phase adjustment can be implemented by the signal delay generated by a resistor connected in series with a capacitor or an inductor connected in series with a capacitor.

Figure 3:
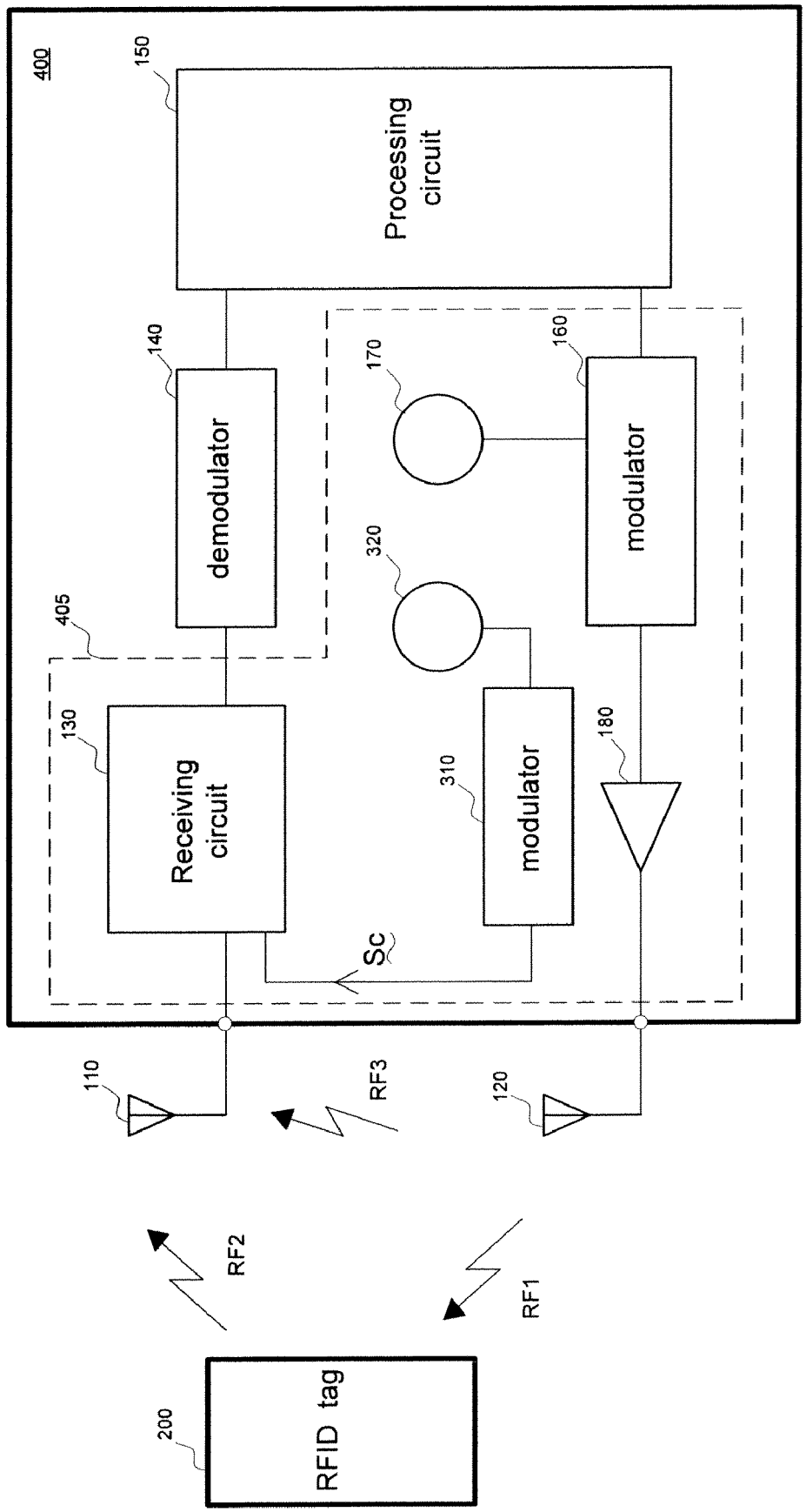
FIG. 3 is a signal transmitting and receiving apparatus capable of preventing the receiving end from saturating according to a second embodiment of the present invention.

FIG. 3 shows the signal transmitting and receiving apparatus according to a second embodiment of the present invention. The reader 400 includes a receiving circuit 130, a demodulator 140, a processing circuit 150, a modulator 160, an oscillator 170, a power amplifier 180, a modulator 310 and an oscillator 320. The receiving circuit 130 receives signal through the antenna 110, and the power amplifier 180 emits signal through the antenna 120. The receiving circuit 130, the modulator 160, the oscillator 170, the power amplifier 180, the modulator 310 and the oscillator 320 form the signal transmitting and receiving circuit 405 of this present invention. The elements of the reader 400 possess the same function as those designated by the same number of the reader 300. The difference between the reader 300 and the reader 400 is that in the reader 400 there is an additional oscillator 320. The oscillator 320 and the oscillator 170 are synchronous by sharing the same reference source. The oscillator 320 is coupled to the modulator 310 for generating an oscillating signal different from the signal generated by the oscillator 170. The oscillating signal generated by the oscillator 170 is referred to as the first oscillating signal, and the oscillating signal generated by the oscillator 320 is referred to as the second oscillating signal. The modulator 310 modulates the second oscillating signal and then transmits the modulated signal Sc to the receiving circuit 130 through a conductive wire in order that the signal Sc attenuates the RF signal RF3 transmitted through wireless transmission. The modulator 310 modulates the frequency and the phase of the second oscillating signal to make the frequency of the signal Sc to be equal or close to the frequency of the RF signal RF3 and also make the signal Sc has a 180 degree phase difference with respect to the RF signal RF3. For example, the first and the second oscillating signals, which are generated by the oscillator 170 and the oscillator 320 respectively, are represented in the form of $\cos(w_c t+\phi)$. When the reader 400 is about to send a command to the RFID tag 200, the modulator 160 modulates the oscillating signal in the form of $A_1 \cos(w_m t)\cos(w_c t+\phi)$ to carry the command. It is noted that the RFID tag 200 does not yet reflect the reflecting signal RF2 to the antenna 110 at that time. When the reader 400 finishes transmitting the command to the RFID tag 200, the modulator 160 stops modulating, and then the reader 400 keeps emitting an RF signal to provide power to the RFID tag 200. At that time, the receiving circuit 130 is ready to receive the reflection signal RF2. It is assumed that the signal which is utilized to power the RFID tag 200 and carries no command is represented in the form of $A_2 \cos(w_c t+\phi)$. On the other hand, to prevent the receiving circuit 130 from saturating, the modulator 310 modulates the second oscillating signal such that the modulated signal Sc has the same frequency and a 180 degree phase difference with respect to the RF signal RF3. Furthermore, by adjusting the amplitude of the signal Sc to be close to the amplitude of the RF signal RF3, these two signals will eliminate each other's power when they are received by the receiving circuit 130 because of the phase difference and amplitudes. As a result, the receiving circuit 130 will not saturate due to the reception of the high-power RF signal RF3. Hence, one of modulating methods of the modulator 310 is to adjust the frequency, phase and amplitude of the second oscillating signal. The modulated signal Sc could be represented in the form of $B \cos(w_c t+\varphi)$, where $\varphi=\phi\pm\pi$.

$$Sc = B\cos(w_c t + \varphi)$$
$$= B\cos(w_c t + \phi \pm \pi)$$
$$= -B\cos(w_c t + \phi)$$

The receiving circuit 130 receives the RF signal RF3 and the signal Sc at the same time.

$$\text{signal\_in} = A_2\cos(w_c t + \phi) - B\cos(w_c t + \phi)$$
$$= (A_2 - B)\cos(w_c t + \phi)$$

According to the above equation, the leakage power from the antenna 120 to the antenna 110 can be eliminated by properly adjusting the amplitude B of the signal Sc to restrain the amplitude of RF signal RF3. One of the main purposes of the modulator 310 is to adjust the phase of the oscillating signal, and it could be performed by several methods. In general, the phase adjustment can be implemented by the signal delay generated by a resistor connected in series with a capacitor or an inductor connected in series with a capacitor.

In summary, an emitting signal from the transmitting end of a signal transmitting and receiving apparatus might be received unexpectedly by the receiving end. If the power of the emitting signal is larger than the capacity of the receiving end, the receiving end will saturate and therefore is not able to receive signals with small power. This kind of problem is usually encountered by an RFID reader. The present invention discloses a method and the corresponding apparatus to solve this problem. The signal transmitting and receiving apparatus is provided with a modulator coupled to the receiving end for generating a modulated signal. The modulated signal is then transmitted through a conductive wire to the receiving end to eliminate the leakage signal from the transmitting end. As a result, the receiving end will not saturate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmitting and receiving apparatus, comprising:
    a signal receiving unit for receiving a first signal and a second signal;
    a first signal generator for generating the first signal; a second signal generator coupled to the signal receiving unit for generating the second signal; and
    an oscillator coupled to the first signal generator and the second signal generator for generating an oscillating signal;
    wherein the first signal generator modulates the oscillating signal to form the first signal, and the second signal generator modulates the oscillating signal to form the second signal, and there is a phase difference between the second signal and the first signal such that in the signal receiving unit the first signal and the second signal eliminate each other's power, and the signal receiving unit receives the first signal through wireless transmission and receives the second signal through a conductive wire.

2. The signal transmitting and receiving apparatus of claim 1, wherein the signal transmitting and receiving apparatus is an RFID reader for communicating with an RFID tag.

3. The signal transmitting and receiving apparatus of claim 1, wherein the first signal and the second signal have the same frequency and the phase difference between the first and the second signals is 180 degree.

4. The signal transmitting and receiving apparatus of claim 1, wherein the second signal generator is a phase delay circuit formed by a resistor connected in series with a capacitor.

5. The signal transmitting and receiving apparatus of claim 1, wherein the second signal generator is a phase delay circuit formed by an inductor connected in series with a capacitor.

6. A signal transmitting and receiving apparatus, comprising:
    a first oscillator for generating a first oscillating signal;
    a second oscillator for generating a second oscillating signal;
    a first signal generator, coupled to the first oscillator for modulating the first oscillating signal to form the first signal;
    a second signal generator, coupled to the second oscillator for modulating the second oscillating signal to form the second signal;
    a signal receiving unit, coupled to the second signal generator for receiving the first signal and the second signal;
    wherein there is a phase difference between the second signal and the first signal such that in the signal receiving unit the first signal and the second signal eliminate each other's power, and the signal receiving unit receives the first signal through wireless transmission and receives the second signal through a conductive wire.

7. The signal transmitting and receiving apparatus of claim 6, wherein the first oscillating signal and the second oscillating signal are synchronous.

8. A method for receiving and transmitting a signal, comprising:
    generating an oscillating signal;
    modulating the oscillating signal to generate a first signal;
    modulating the oscillating signal to generate a second signal;
    transmitting the first signal to a signal receiving unit through wireless transmission; and
    transmitting the second signal to the signal receiving unit through a conductive wire;
    wherein there is a phase difference between the second signal and the first signal such that in the signal receiving unit the first signal and the second signal eliminate each other's power.

9. The method of claim 8, wherein the first signal and the second signal have the same frequency and the phase difference between the first and the second signals is 180 degree.

10. The method of claim 8, wherein the second signal is formed by delaying the phase of the oscillating signal, and the phase delay is 180 degree.

11. The method of claim 8, further comprising:
    modulating the amplitude of the oscillating signal such that the amplitude of the second signal is close to the amplitude of the first signal.

12. A method for receiving and transmitting a signal, comprising:
    generating a first oscillating signal;
    generating a second oscillating signal which is synchronous to the first oscillating signal;
    modulating the first oscillating signal to generate a first signal;
    modulating the second oscillating signal to generate a second signal;
    transmitting the first signal to a signal receiving unit through wireless transmission; and
    transmitting the second signal to the signal receiving unit through a conductive wire;
    wherein there is a phase difference between the second signal and the first signal such that in the signal receiving unit the first signal and the second signal eliminate each other's power.

13. The method of claim 12, wherein the second signal is formed by modulating the frequency and the phase of the second oscillating signal, and the first signal and the second signal have the same frequency and the phase difference between the first and the second signals is 180 degree.

14. An RFID reader, characterized by comprising:
    a receiving unit for receiving a first signal and a second signal;
    an oscillator for generating an oscillating signal
    a first modulator, coupled to the oscillator for modulating the oscillating signal to generate the first signal;

a power amplifier, coupled to the first modulator for amplifying the first signal; and a second modulator, coupled to the oscillator and the receiving unit for modulating the oscillating signal to generate the second signal;

wherein there is a phase difference between the second signal and the first signal such that in the signal receiving unit the first signal and the second signal eliminate each other's power.

15. The RFID reader of claim 14, wherein the signal receiving unit receives the first signal through wireless transmission, and receives the second signal through a conductive wire.

16. The RFID reader of claim 14, wherein the first signal and the second signal have the same frequency and the phase difference between the first and the second signals is 180 degree.

17. The RFID reader of claim 14, wherein the second modulator is a phase delay circuit formed by a resistor connected in series with a capacitor.

18. The RFID reader of claim 14, wherein the second modulator is a phase delay circuit formed by an inductor connected in series with a capacitor.

19. A signal transmitting and receiving apparatus, comprising:

a signal receiving unit for receiving a first signal and a second signal;

a first signal generator for generating the first signal;

a second signal generator coupled to the signal receiving unit for generating the second signal; and an oscillator coupled to the first signal generator and the second signal generator for generating an oscillating signal;

wherein there is a phase difference between the second signal and the first signal such that in the signal receiving unit the first signal and the second signal eliminate each other's power, and the first signal generator modulates the oscillating signal to form the first signal, and the second signal generator modulates the oscillating signal to form the second signal.

* * * * *